US008872623B2

(12) United States Patent
Simpson

(10) Patent No.: US 8,872,623 B2
(45) Date of Patent: Oct. 28, 2014

(54) VOICE ALARM

(75) Inventor: Cherie Ann Simpson, Mill Valley, CA (US)

(73) Assignee: Cherie Ann Simpson, Mill Valley, CA (US)

( * ) Notice: Subject to any disclaimer, the term of this patent is extended or adjusted under 35 U.S.C. 154(b) by 294 days.

(21) Appl. No.: 13/299,247

(22) Filed: Nov. 17, 2011

(65) Prior Publication Data

US 2012/0182126 A1 Jul. 19, 2012

Related U.S. Application Data

(60) Provisional application No. 61/432,457, filed on Jan. 13, 2011.

(51) Int. Cl.
*G08B 5/22* (2006.01)
*G08B 15/00* (2006.01)
*G06F 13/42* (2006.01)

(52) U.S. Cl.
CPC .................................... *G08B 15/004* (2013.01)
USPC ............................................ 340/6.1; 340/1.1

(58) Field of Classification Search
USPC .................................................... 340/1.1, 6.1
See application file for complete search history.

(56) References Cited

U.S. PATENT DOCUMENTS

| | | | | |
|---|---|---|---|---|
| 4,463,879 | A * | 8/1984 | Des Voignes | 222/175 |
| 5,196,829 | A * | 3/1993 | Janis | 340/574 |
| 5,556,003 | A * | 9/1996 | Johnson et al. | 222/39 |
| 5,986,540 | A * | 11/1999 | Nakagaki et al. | 340/384.7 |
| 6,028,514 | A * | 2/2000 | Lemelson et al. | 340/539.13 |
| 6,278,365 | B1 * | 8/2001 | Kane et al. | 340/531 |
| 7,002,467 | B2 * | 2/2006 | Deconinck et al. | 340/539.1 |
| 2004/0145493 | A1 * | 7/2004 | O'Connor et al. | 340/870.09 |
| 2005/0030190 | A1 * | 2/2005 | Turner | 340/691.1 |
| 2005/0174243 | A1 | 8/2005 | Musil | |
| 2006/0153007 | A1 * | 7/2006 | Chester | 368/12 |
| 2008/0122649 | A1 * | 5/2008 | Liu et al. | 340/825.36 |
| 2008/0211677 | A1 * | 9/2008 | Shecter | 340/573.1 |
| 2010/0007484 | A1 * | 1/2010 | Song | 340/533 |
| 2010/0271197 | A1 * | 10/2010 | Almeida | 340/532 |
| 2011/0075874 | A1 * | 3/2011 | Richards | 381/334 |

FOREIGN PATENT DOCUMENTS

| | | |
|---|---|---|
| CN | 201072581 | 6/2008 |
| WO | WO-2008/045003 A1 | 4/2008 |

* cited by examiner

*Primary Examiner* — Brent Swarthout
*Assistant Examiner* — Omar Casillashernandez
(74) *Attorney, Agent, or Firm* — Michael A. Glenn; Perkins Coie LLP

(57) ABSTRACT

An alarm device configured with a power supply, a processing unit, speakers and an activator for emitting a voice alarm to alert passersby that the alarm holder is in danger. A handheld alarm device for alerting people more effectively than a mere tonal alarm.

19 Claims, 6 Drawing Sheets

VOICE ALARM

CROSS REFERENCE TO RELATED APPLICATIONS

This application claims priority to Provisional Patent Application Ser. No. 61/432,457, filed Jan. 13, 2011, entitled “Voice Alarm” which is incorporated herein in its entirety.

BACKGROUND OF THE INVENTION

1. Technical Field

The invention relates to safety devices. More particularly, the invention relates to personal alarm systems that emit a voice alarm instead of, or in addition to, a tonal alarm.

2. Description of the Prior Art

Various personal security devices are used by persons in potentially dangerous situations. For example, many women, out of a fear of being attacked, carry or pack whistles, deterrent sprays, or even weapons when walking or exercising alone.

When the person carrying the alarm perceives danger, the alarm can be located, readied, and activated to emit an alarm for the purpose of warding off a potential attacker. However, known devices suffer from numerous drawbacks. One drawback is that most alarms are usually carried in the woman’s purse and thus may be difficult to locate when needed. Likewise, if an assailant approaches a victim from behind, the victim oftentimes will not have enough time to locate and use a whistle or similar device.

Additionally, for alarms carried in the hand, another drawback relates to the persons initial reaction to attack. One of the first reactions of a person about to be attacked is a fright reaction in which one automatically opens one’s hands. With the presently available alarm devices, the person may drop the alarm device and have difficulty locating the device after recovering from such a reaction. Also, such devices can be easily inactivated by the attacker.

Finally, the nearly-constant receipt of auditory stimuli of urban life will oftentimes cause a person to filter, or even ignore completely, the sounds of alarms, whistles, or other sounds intended to alert passersby in the first place.

SUMMARY OF THE INVENTION

The invention provides a user with a loud voice alarm rather than a mere tonal alarm. This distinction provide a solution that is significantly more effective in alerting people as it is much more likely that a passerby would respond to a clear “call for help” (i.e. “Help! Call Police! I need help! Please help me!”), as opposed to an alarm tone sounding like other alarms that a person hears on a frequent basis.

Additionally, the vocal alarm acts as an element of surprise to an attacker and is more likely to scare the potential assailant off, while at the same time attracting good Samaritans to assist the person in need.

Some embodiments of the invention involve an alarm device that ergonomically fits in a human’s hand and secured with a strap. According to these embodiments, a user can activate the alarm despite being startled and opening their hand.

Some embodiments of the invention involve an alarm device having one or more of an alarm selection interface, a microphone for personalized voice alarm, or an audio input. Some embodiments of the invention involve a computer interface for adding, removing, and/or modifying voice alarm options. Some embodiments of the invention involve a deactivation interface for inputting a security code.

Some embodiments of the invention involve GPS tracking of the device, providing the location of the attack to authorities and automatically phone dialing to 911 or other selected numbers to notify that this person’s device has been compressed and they are in trouble.

DETAILED DESCRIPTION OF THE INVENTION

Figure 1:
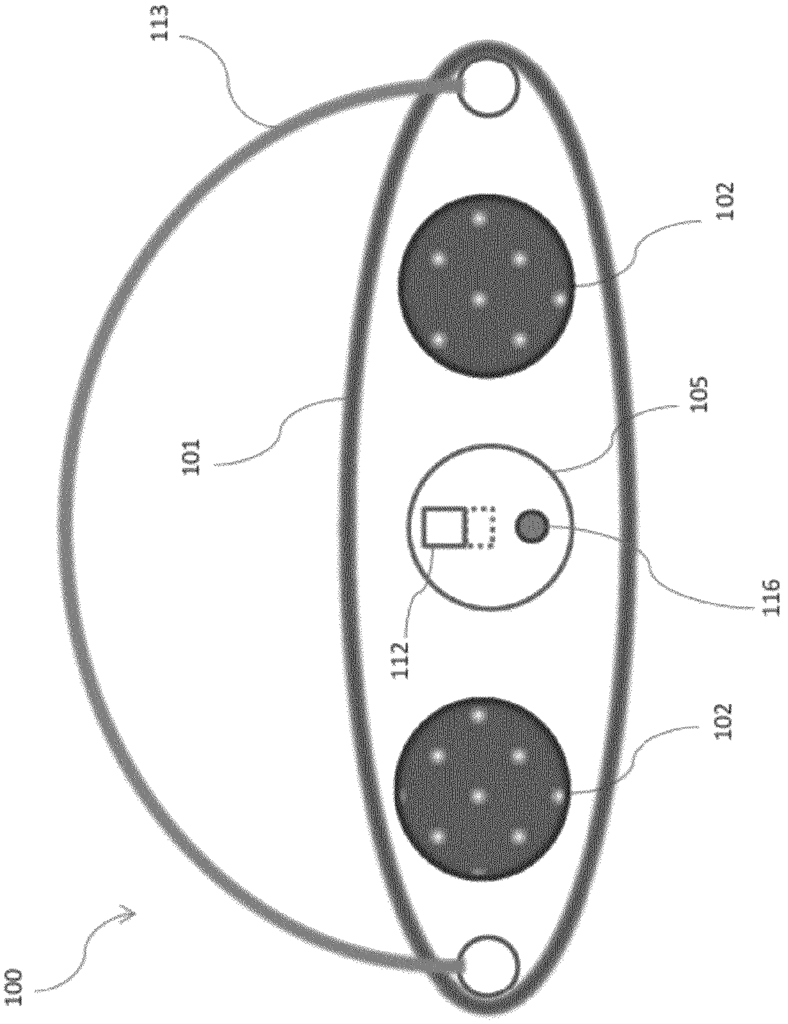
FIG. 1 illustrates the front side of an alarm device according to some embodiments of the invention.

FIG. 1 illustrates the front side of an alarm device 100 according to some embodiments of the invention. According to FIG. 1, the front side of the alarm device 100 comprises a body 101 shaped to ergonomically fit in a human’s hand. The body 101 is configured with one or more speakers 102 and an activator 105. In the presently preferred embodiments of the invention, the activator 105 comprises a button. In some embodiments of the invention, the activator 105 includes a safety switch 112 to prevent inadvertent alarms and a low-battery indicator 116.

Figure 2:
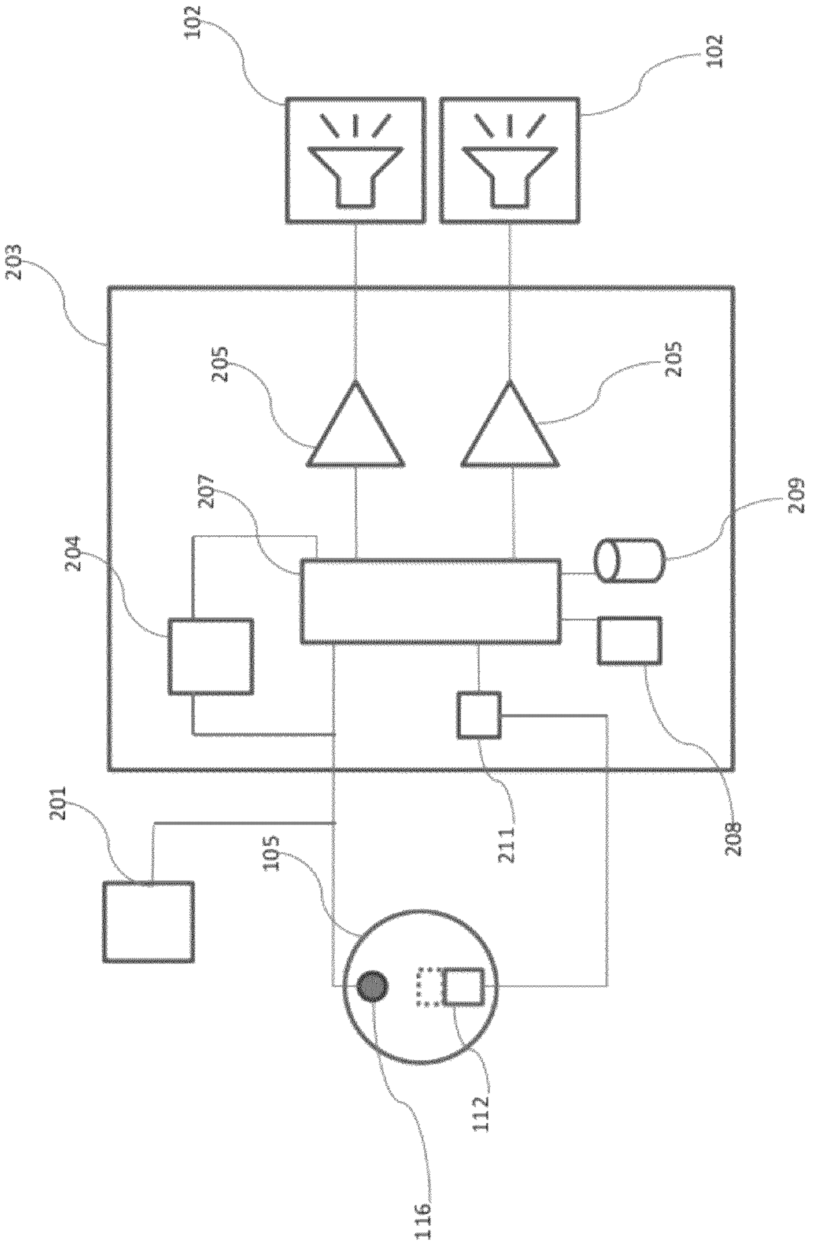
FIG. 2 illustrates a block diagram of certain components of the device according to some embodiments of the invention.

FIG. 2 illustrates a block diagram of certain components of the device 100 according to some embodiments of the invention. According to FIG. 2, a power source 201, preferably batteries, is coupled with a processing unit 203. The processing unit 203 includes at least a processor 207, a memory 208, and a Voice Alarm database 209.

In some embodiments of the invention, the processor 207 is coupled with power test circuitry 204. The processor 207 is coupled to receive power from power source 201. The processor is further coupled to receive a signal from power test circuitry 204 indicating whether the power level of the power source 201 is either low or high. In some embodiments of the invention, the device includes a low-battery indicator 116. In the presently preferred embodiments of the invention, the low-battery indicator 116 comprises a light emitting diode (LED). Likewise, in some embodiments of the invention, the power source 201 is rechargeable.

The processing unit 203 is also coupled with at least one speaker 102 and the activator 105. Accordingly, a signal from the activator 105 is processed with the processor 207 and causes the speaker 102 to emit an alarm from the Voice Alarm database 209.

As explained above, people who are used to alarms sounding often filter, or even ignore completely, the sounds of alarms, whistles, or other sounds intended to alert passersby in the first place. Accordingly, the Voice Alarm database 209 includes various voice alarm recordings or simulations of human voices. These recordings are intended to alert passersby more effectively than a mere tonal alarm that may be filtered out by passersby. For example, the Voice Alarm database 209 can include a recording of a woman screaming "Help! Call the Police!" In some embodiments, the Voice Alarm database 209 may also include tonal alarms or other alarms to supplement the voice alarm. For example, along with the voice alarm of "Help! Call the Police!" the device may also emit an ear piercing tonal or buzzing alarm to startle, disorient, or cause pain to an attacker.

In the presently preferred embodiments of the invention, the alarm emitted from the speaker has a very large sound intensity. Accordingly, the processing unit 203 includes amplifiers 205 for amplifying the sound that is delivered to the speakers 102. In the presently preferred embodiments of the invention, the sound intensity is around the order of 140 decibels.

Figure 3:
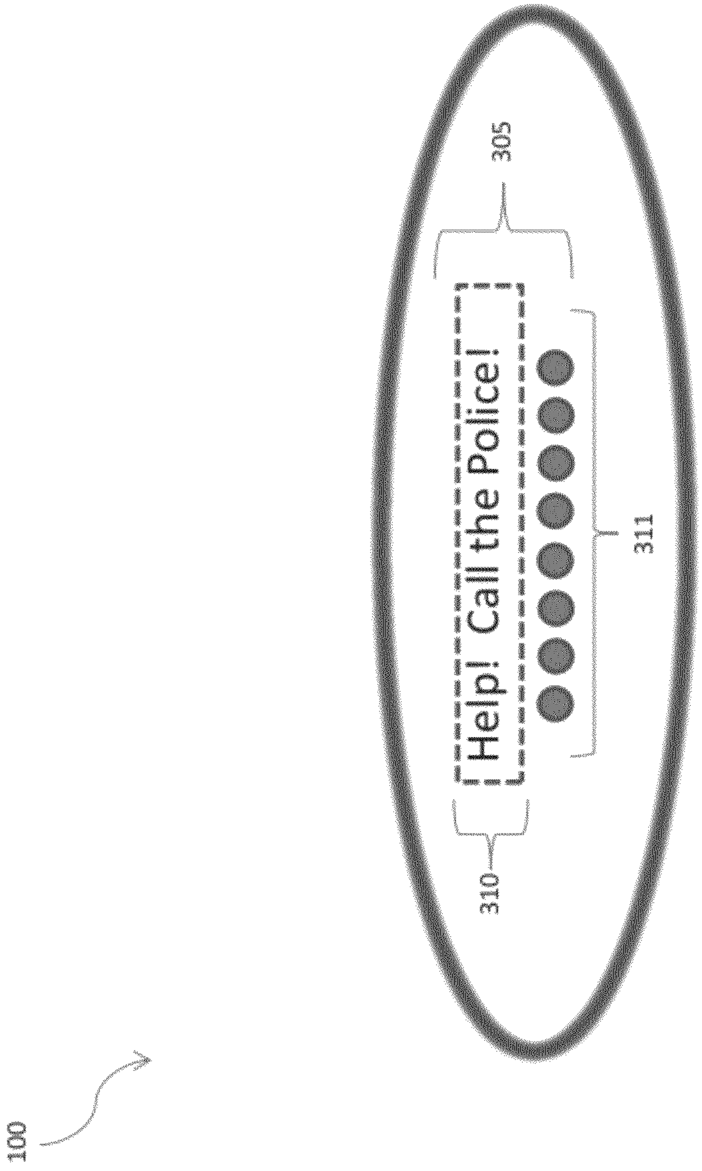
FIG. 3 illustrates a rear view of the device having an interface of selecting voice alarm options according to some embodiments of the invention.

In the presently preferred embodiments of the invention, a user is provided with the option of selecting from among a plurality of voice alarms. FIG. 3 illustrates a rear view of the device 100 having an interface 305 of selecting voice alarm options according to some embodiments of the invention. The interface 305 comprises a plurality of buttons 311 for selecting voice alarm options and a display 310 for showing the user the currently-selected option.

In some embodiments of the invention, this voice alarm database 209 includes options to select a woman's, child's, elderly person's, or man's voice as well as a shuffle feature. In some embodiments, the shuffle feature allows the option of having a second voice follow the first—giving an attacker the impression that a person nearby is answering the voice alarm's call for help. For example, with a first voice alarm broadcasting "Help! Call the Police!" the second voice would answer "Hey! What's going on there?" or "I have called 911! Help is on the way!"

In addition to pre-recorded or computer-generated voice alarms, a user may wish to configure the device 100 with a personalized message. Emitting a personalized message can aide a person in many situations. For example, if a runner is injured and incapacitated in an inconspicuous location, the user of the device 100 may want to record a message describing where they are, i.e. "Please help! I fell down the ravine!" Additionally, a user may wish to pre-record a personalized recording to assist respondents in the event of the occurrence of a known risk. For example, a person who suffers from epileptic seizures sometimes will experience warning signs that seizure is inevitable. In this case, the person could record a message instructing respondents how to assist, to call an ambulance, explain how to administer medication, or to explain drug allergies, or other personalized messages.

Figure 4:
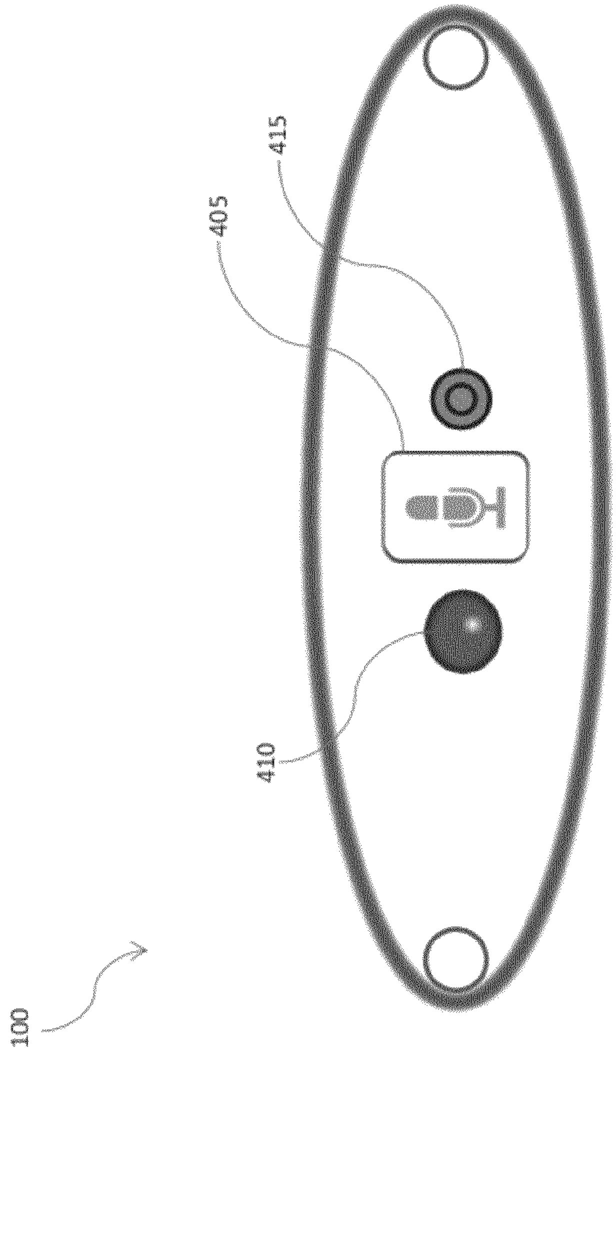
FIG. 4 illustrates a rear view of the device with voice recording capabilities according to some embodiments of the invention.

FIG. 4 illustrates a rear view of the device 100 with voice recording capabilities according to some embodiments of the invention. According to FIG. 4, the device 100 includes a record button 405, a microphone 410, and an input jack 415 for importing voice recordings.

In some embodiments of the invention, the device 100 is scalable and includes an interface for adding, modifying, or removing various features, capabilities, voice alarms, etc. For example, in some embodiments of the invention, the device 100 includes a wireless receiver (i.e. Bluetooth) for downloading features. In some other embodiments of the invention, the device is configured with a Universal Serial Bus (USB) interface for coupling with a computer for both recharging the batteries and for adding, modifying, or removing device 100 features.

Figure 5:
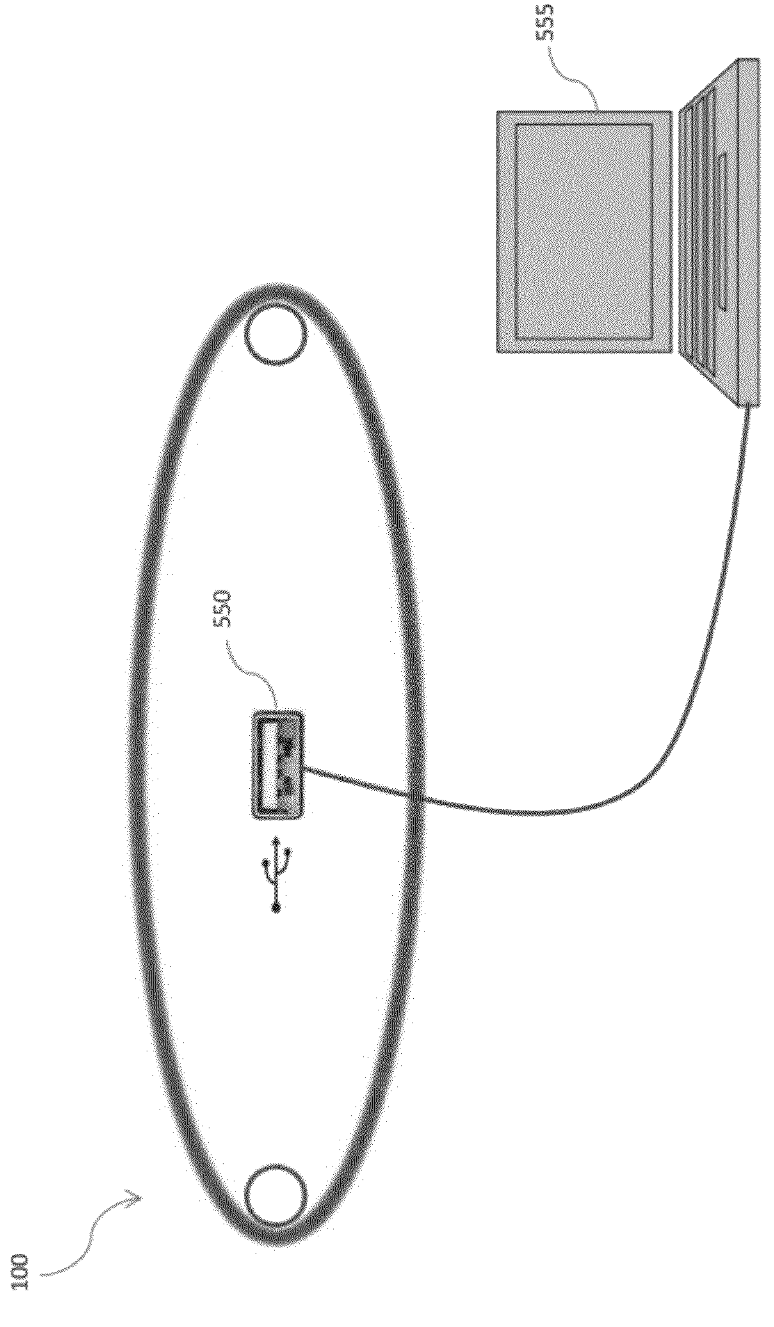
FIG. 5 illustrates a rear view of the alarm device with a USB port for interfacing with a computer according to some embodiments of the invention.

FIG. 5 illustrates a rear view of the alarm device 100 with a USB port 550 for interfacing with a computer 555 according to some embodiments of the invention. According to these embodiments, a user can interface with the memory 208 and the Voice Alarm database 209 via USB port 550 to add, modify, or remove features of the alarm device 100. For example, a user may add voice foreign language voice alarms before embarking on a trip to a foreign location. Also, the user can add location-specific voice instructions, i.e. "Call 999" for United Kingdom, as opposed to "Call 911" for the United States. Likewise, the user may add other pre-scripted voice alarms that have been created for specific purposes, i.e. "I am having an epileptic seizure. Please call 911."

In the presently preferred embodiments of the invention, the device 100 is configured with at least one switch 211 for deactivating the processing unit 203 and the alarm. According to these embodiments, once the button is pressed, the Voice Alarm continues to play the cry for help until the owner deactivates the alarm, thereby preventing an assailant from simply turning the alarm off once the victim is subdued.

Figure 6:
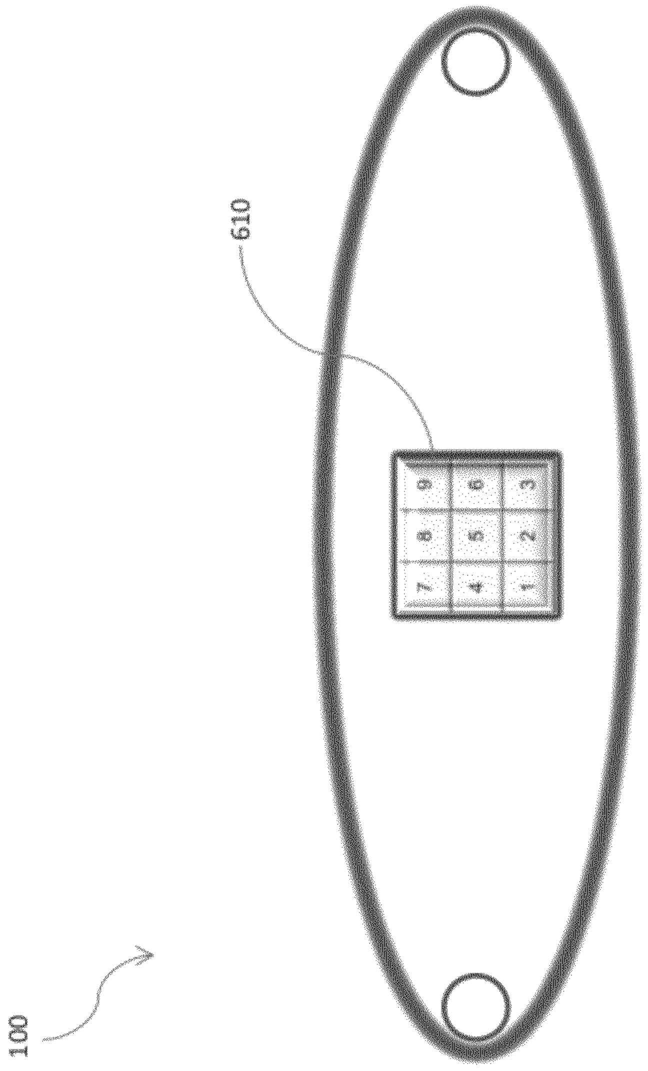
FIG. 6 illustrates a rear view of an alarm device with an interface for deactivating the alarm according to some embodiments of the invention.

FIG. 6 illustrates a rear view of an alarm device 100 with an interface 610 for deactivating the alarm according to some embodiments of the invention. According to these embodiments, after the alarm is activated, a user must remove the device 100 and enter a personal code on the interface 610 in order to deactivate the alarm. For example, in FIG. 6, the interface 610 comprises a 9-button keypad for entering a configurable security code.

In addition to the vocal "cry for help", other option for the device include GPS tracking of the device, providing the location of the attack to authorities and automatically phone dialing to 911 or other selected numbers to notify that this person's device has been compressed and they are in trouble.

As explained above, if startled or actually assaulted, a person may drop the alarm device and have difficulty locating the device after recovering from such a reaction. Accordingly, the presently preferred embodiments of the invention include a strap coupled with the device.

Referring again to FIG. 1, the strap 113 provides the option of wearing the device 100. This is especially convenient for runners. In some embodiments of the invention, the strap 113 comprises a neoprene-style stretch fabric which slides easily over the four fingers onto the back of the hand, while the attached device 100 rests in the palm of the hand. According to this configuration, the user's hands and fingers are free to move while the device 100 is held in the palm of the hand by the stretch-neoprene strap 113. This way, even if an attacker grabs a person and covers their mouth or pulls their arms, the device 100 can still easily be compressed, without the worry of dropping it or not being able to reach it quickly.

Also, in this configuration, the button 105 on the device is compressed by pushing down with the middle fingers. In some embodiments of the invention, the button 105 is configured with a threshold pressure required to activate such that one would have to make an effort to compress the button with the middle finger so it could not be easily set off by just touching the button accidentally.

Although the invention described herein with reference to the preferred embodiments, one skilled in the art will readily appreciate that other applications may be substituted for those set forth herein without departing from the spirit and scope of the invention. Accordingly, the invention should only be limited by the Claims included below.

The invention claimed is:

1. A personal safety alarm consisting:

an alarm body configured to fit in the palm of a human hand, the alarm body comprising a housing containing an alarm device:

the alarm device consisting of:

a power source;

a processor:

a voice alarm database containing at least one voice alarm, wherein said voice alarm database contains a plurality of voice files comprising pre-recorded human voices, digitally created representations of human voices, or combinations thereof, and;

a voice recorder, wherein the voice recorder records a human voice to create a voice alarm comprising a custom message for requesting help, and storing the voice alarm in the voice alarm database, and wherein said voice recorder stores said voice alarm in at least one voice file comprising an audio file that, when played through said speaker, sounds like the wearer is crying for help;

at least one speaker; and a button, wherein pressing said button causes said processor to play a voice alarm through said at least one speaker, in which a second voice follows a first voice, giving an attacker the impression that a person nearby is answering the voice alarm's call for help; and a strap attached to the housing for holding the alarm body in the palm of an open hand.

2. The personal safety alarm of claim 1, wherein said button is configured in a position that is reachable by a wearer's finger when said alarm body is held in the wearer's palm by the strap and when the wearer's hand is open.

3. The personal safety alarm of claim 1, wherein said strap is configured to stretch around the outside of a wearer's hand when the alarm body is in a wearer's palm; and the strap is made of a stretch fabric which slides over the four fingers onto the back of the hand.

4. The personal safety alarm of claim 1, wherein said power source comprises batteries.

5. The personal safety alarm of claim 1, wherein said power source comprises a battery and charging circuitry, wherein said alarm further comprises a power adaptor, and wherein said alarm body further comprises a jack for connecting said power adaptor to said charging circuitry.

6. The personal safety alarm of claim 1, further comprising an alarm selection interface comprising a display and at least one toggle button for selecting a voice file from said plurality of voice files.

7. The personal safety alarm of claim 1, further comprising at least one amplifier for increasing the volume of the at least one voice alarm.

8. The personal safety alarm of claim 7, wherein said at least one amplifier is configured for increasing the volume of the at least one voice alarm to a sound intensity of at least 140 decibels.

9. The personal safety alarm of claim 1, wherein said processor is configured for playing said at least one voice alarm repeatedly until deactivated.

10. The personal safety alarm of claim 1, wherein said power source is coupled with a power test circuit, and wherein said alarm further comprises an indicator configured for indicating when said power source is low on power.

11. The personal safety alarm of claim 1, further comprising a safety switch configured to prevent inadvertent activation of said button.

12. The personal safety alarm of claim 1, wherein the voice recorder further comprises a microphone and a record button, wherein said microphone is configured to record a voice alarm upon activation of said record button.

13. The personal safety alarm of claim 1, further comprising an audio input jack for importing an externally stored voice alarm into said voice alarm database.

14. The personal safety alarm of claim 1, further comprising a universal serial bus port configured for importing data and re-charging said power source.

15. The personal safety alarm of claim 1, further comprising a deactivation interface for accepting a deactivation code, thereby deactivating said voice alarm.

16. The personal safety alarm of claim 1, wherein the voice alarm database contains a first voice alarm that is recorded in a first spoken language and a second voice alarm recorded in a second spoken language different from the first spoken language.

17. A hand-held voice alarm, consisting of:

an ergonomic alarm body configured for fitting into a human hand and configured in a position that is reachable by a wearer's finger when said alarm body is in a wearer's palm;

a strap coupled with said alarm body, wherein said strap is configured to stretch around the outside of a wearer's hand when the alarm body is in a wearer's palm;

a rechargeable power source coupled with a power test circuit;

an indicator coupled with said power test circuit and configured for indicating when said power source is low on power;

a processor;

at least one speaker;

a voice alarm database containing a plurality of voice files that when played through said at least one speaker, sound like the wearer is crying for help, in which a second voice follows a first voice, giving an attacker the impression that a person nearby is answering the voice alarm's call for help, and wherein said plurality of voice files comprising pre-recorded human voices, digitally created representations of human voices, or combinations thereof:

at least one amplifier for enhancing the power of the at least one voice file and a button, wherein pressing said button causes said processor to play said aleast one voice file through said at least one speaker; and a safety switch configured to prevent inadvertent activation of said button.

18. The personal safety alarm of claim 3, wherein the strap is made of neoprene.

19. The personal safety alarm of claim 1, wherein the custom message for requesting help alerts passersby of the need for help with:

a known risk including being assaulted or a medical emergency, wherein the custom message provides contact information or help instructions; or locating the wearer who is out of sight and whose location is unknown.

* * * * *